United States Patent [19]

Nakajima

[11] Patent Number: 4,851,701
[45] Date of Patent: Jul. 25, 1989

[54] RADIATION IMAGE READ-OUT METHOD AND APPARATUS

[75] Inventor: Nobuyoshi Nakajima, Kanagawa, Japan

[73] Assignee: Fuji Photo Film Co., Ltd., Kanagawa, Japan

[21] Appl. No.: 61,613

[22] Filed: Jun. 15, 1987

[30] Foreign Application Priority Data

Jun. 13, 1986 [JP] Japan ................................ 61-137661
Feb. 18, 1987 [JP] Japan ................................ 62-35226

[51] Int. Cl.$^4$ ............................................. G01T 1/105
[52] U.S. Cl. ................................ 250/327.2; 250/484.1
[58] Field of Search .................... 250/327.2, 484.1; 364/414, 413.13; 382/6, 22, 19, 18, 10; 358/284, 256; 378/99

[56] References Cited

U.S. PATENT DOCUMENTS 3,705,383  12/1972  Frager ................................. 382/18
4,688,088   8/1987  Hamazaki et al. .................. 382/18
4,710,875  12/1987  Nakajima et al. .................. 364/414

OTHER PUBLICATIONS

Bodin et al., "A Letter Encoder... of Geometric Char. Conference".
Preceeding of the Conf. on Mach. Preception of Patterns & Pict. Yeddington Middx, England (Apr. 12–14, 1972) p. 216 (382–18).

Primary Examiner—Janice A. Howell
Assistant Examiner—Richard Hanig
Attorney, Agent, or Firm—Sughrue, Mion, Zinn, MacPeak & Seas

[57] ABSTRACT

In a radiation image read-out method and apparatus, final read-out is carried out for detecting image signals for use in reproduction of a visible image from a recording medium carrying a radiation image recorded thereon, and read-out conditions for the final read-out and/or image processing conditions are adjusted based on image signals for condition adjustment detected by reading out the image information recorded on the recording medium. The image signals for condition adjustment are utilized to judge whether the image which the image signals represent has line symmetry or not. The read-out conditions for the final read-out and/or the image processing conditions are adjusted in accordance with the results of the discrimination so that the density of a region concerned in the reproduced visible image is maintained constant regardless of the image recording direction of an object.

12 Claims, 6 Drawing Sheets

IRRADIATION FIELD

IRRADIATION FIELD

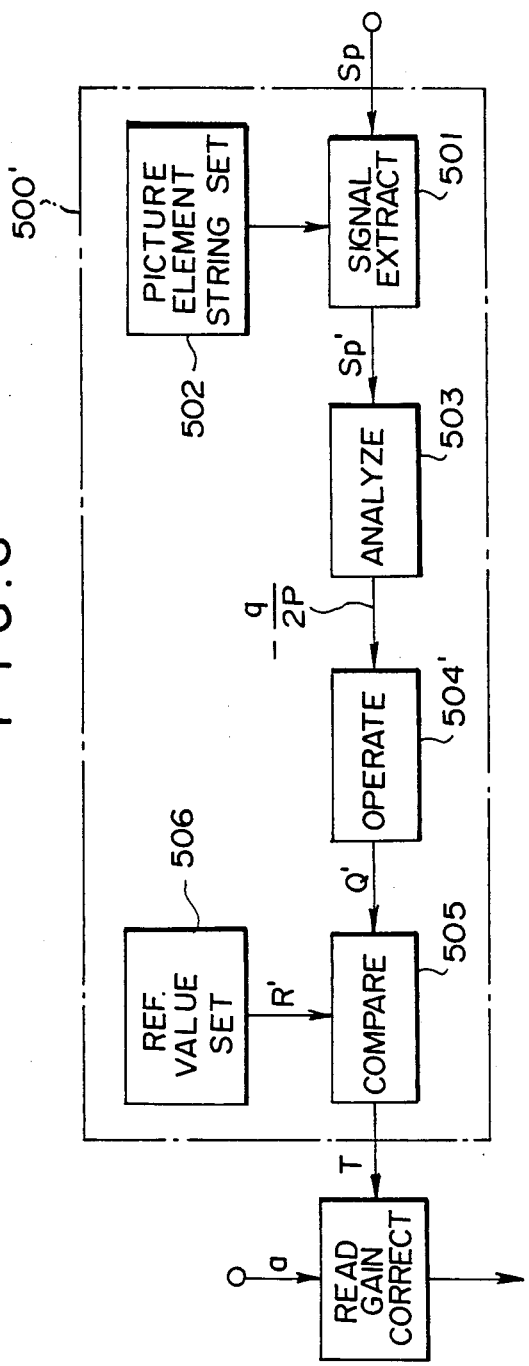

RADIATION IMAGE READ-OUT METHOD AND APPARATUS

BACKGROUND OF THE INVENTION

1. Field of the Invention

This invention relates to a method of reading out a radiation image wherein final read-out is carried out for detecting image signals for use in reproduction of a visible image from a recording medium such as a stimulable phosphor sheet carrying a radiation image recorded thereon, and an apparatus for carrying out the method. This invention particularly relates to a method of reading out a radiation image so that the density of an object region concerned in a visible image reproduced based on the read-out image signals is prevented from differing between images of the object recorded in different image recording directions, and an apparatus for carrying out the method.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon. Then, final read-out is carried out by exposing the stimulable phosphor sheet carrying the radiation image stored thereon to stimulating rays such as a laser beam which cause the stimulable phosphor sheet to emit light in proportion to the stored radiation energy, and photoelectrically detecting the emitted light to obtain electric image signals for use in reproduction of a visible image. An image processing is carried out on the final read-out image signals obtained by the final read-out, and the radiation image of the object is reproduced as a visible image by use of the processed image signals on a recording medium such as a photographic film, a display device such as a cathode ray tube (CRT), or the like.

In the aforesaid radiation image recording and reproducing system, the range of the level of the radiation energy stored on the stimulable phosphor sheet is caused to fluctuate among radiation images by changes in the object, the image recording portion thereof, radiation dose, or the like.

However, in the aforesaid radiation image recording and reproducing system, the recorded image information, particularly the range of the level of the radiation energy or the like, of each radiation image stored on the stimulable phosphor sheet may be ascertained in advance, and the final read-out may be carried out by use of read-out conditions such as a read-out gain and a scale factor adjusted to appropriate values in accordance with the recorded image information of each radiation image. In this case, for each radiation image, it becomes possible to obtain a visible image free from adverse effects of the fluctuation in the range of the level of the radiation energy stored on the stimulable phosphor sheet and suitable for viewing, particularly for diagnostic purposes, for example, a visible image wherein the necessary object image information is always expressed within the correct density range suitable for viewing, particularly for diagnostic purposes.

Also, in the aforesaid radiation image recording and reproducing system, the image processing of the final read-out image signals obtained by the final read-out is carried out by use of image processing conditions such as gradation processing conditions adjusted for each radiation image based on the image recording portion of the object such as the head, the chest or the abdomen, and/or the image recording method such as plain image recording or contrasted image recording so that a visible image suitable for viewing, particularly for diagnostic purposes, can be obtained. However, for example, in the case where the final read-out is carried out without using the read-out conditions adjusted to appropriate values in accordance with the recorded image information of each radiation image, the image processing conditions should preferably be adjusted by considering the recorded image information of each radiation image, which has been ascertained in advance, besides the image recording portion of the object and/or the image recording method. In this manner, it becomes possible to obtain a visible image suitable for viewing, particularly for diagnostic purposes, wherein the necessary object image information is expressed within the correct density range.

Ascertaining of the image information recorded on the stimulable phosphor sheet prior to the final read-out and the image processing may be carried out by use of the method as disclosed in Japanese Unexamined Patent Publication No. 58(1983)-67240. In the disclosed method, preliminary read-out for ascertaining the recorded image information of a radiation image stored on the stimulable phosphor sheet is carried out in advance by use of stimulating rays having stimulation energy of a level lower than the level of the stimulation energy of stimulating rays used in the final read-out for detecting the image signals for use in reproduction of a visible image for viewing, particularly for diagnostic purposes, and thereafter the final read-out is carried out. The read-out conditions for the final read-out and/or the image processing conditions are adjusted based on the recorded image information ascertained by the preliminary read-out, i.e. the preliminary read-out image signals obtained by the preliminary read-out.

As mentioned above, the level of the stimulating rays used in the preliminary read-out is lower than the level of the stimulating rays used in the final read-out. Specifically, the effective energy of the stimulating rays which the stimulable phosphor sheet receives per unit area in the preliminary read-out should be lower than the effective energy of the stimulating rays used in the final read-out.

In the case where only the image processing conditions are to be adjusted based on the recorded image information, it is only necessary that the recorded image information be ascertained prior to the image processing. In this case, since the final read-out image signals representing the recorded image information have already been detected, the image processing conditions can be adjusted based on the final read-out image signals, and the preliminary read-out as mentioned above need not necessarily be carried out.

However, in the case where the radiation image read-out conditions for the final read-out and/or the image processing conditions are adjusted as mentioned above, the density of a region concerned in the object often differs between reproduced visible images when radiation images of the same object are recorded in different image recording directions. This problem will hereinbelow be described in detail. FIG. 2A shows the case where an image of the chest is recorded from the front of the object for diagnosis of the thoracic vertebrae, and FIG. 2B shows the case where an image of the chest is recorded from the side of the object. In the case of the front image recording as shown in FIG. 2A, since the thoracic vertebrae K which are the region concerned overlap the mediastinum through which a radiation cannot readily pass, the amount of the radiation stored at the thoracic vertebra image portion on a stimulable phosphor sheet 103 is small, and only a small amount of light is emitted by the thoracic vertebra image portion on the stimulable phosphor sheet 103 as shown by the histogram of the read-out image signals in FIG. 3A when the sheet 103 is exposed to stimulating rays. On the other hand, in the case of the side image recording as shown in FIG. 2B, since the thoracic vertebrae K overlap the lungs through which a radiation can readily pass, the amount of the radiation stored at the thoracic vertebra image portion on a stimulable phosphor sheet 103 is large, and a large amount of light is emitted by the thoracic vertebra image portion on the stimulable phosphor sheet 103 as shown by the histogram of the read-out image signals in FIG. 3B when the sheet 103 is exposed to stimulating rays. Since the maximum value Smax and the minimum value Smin of the readout image signals detected from the stimulable phosphor sheet do not much differ between the front image recording and the side image recording, the read-out conditions for the final read-out and/or the image processing conditions adjusted by a method of adjustment based on the maximum value Smax and the minimum value Smin of the read-out image signals as one of the conventional methods of adjustment based on the recorded image information become approximately equal between the front image recording and the side image recording. Therefore, when the image read-out is carried out and a visible image is reproduced by use of the read-out conditions and/or the image processing conditions adjusted in this manner, the density of the thoracic vertebra image portion becomes comparatively low in the reproduced visible image obtained in the case of the front image recording, and becomes comparatively high in the case of the side image recording.

Besides the aforesaid image recording portion of the object and the aforesaid image recording directions, the problems as mentioned above generally arise between the case where an object portion exhibiting a particularly high or low radiation absorptivity overlaps an object region concerned in the course of image recording and the case where such an object portion does not overlap the object region concerned, depending on the image recording direction of the object.

If the image density of the object region concerned differs between radiation images recorded in different image recording directions of the object, it becomes not always possible to accurately diagnose by the utilization of the radiation images.

The problems as mentioned above may arise also when a radiation image recorded on a recording medium other than the stimulable phosphor sheet is read out to reproduce a visible image.

SUMMARY OF THE INVENTION

The primary object of the present invention is to provide a method of reading out a radiation image wherein, in the course of reproducing a visible radiation image by reading out a radiation image from a recording medium such as a stimulable phosphor sheet carrying the radiation image of an object recorded thereon in a different image recording direction, the density of a region concerned in the reproduced visible image is maintained constant regardless of the image recording direction.

Another object of the present invention is to provide a method of reading out a radiation image, which is suitable for obtaining a reproduced visible image having an improved image quality, particularly a high diagnostic efficiency and accuracy.

The specific object of the present invention is to provide an apparatus for carrying out the method of reading out a radiation image.

A further object of the present invention is to provide a method of discriminating whether an image has line symmetry or not.

The present invention provides a method of reading out a radiation image in which final read-out is carried out for detecting image signals for use in reproduction of a visible image from a recording medium carrying a radiation image recorded thereon, and read-out conditions for the final read-out and/or image processing conditions for an image processing of final read-out image signals detected by the final read-out are adjusted based on image signals for condition adjustment detected by reading out the image information recorded on the recording medium, wherein the improvement comprises the steps of:

(i) discriminating, based on said image signals for condition adjustment, whether the image which said image signals represent has line symmetry or not, and (ii) adjusting said read-out conditions for the final read-out and/or said image processing conditions in accordance with the results of said discrimination.

The present invention also provides a radiation image read-out apparatus comprising a final read-out system provided with a means for emitting light to a recording medium carrying a radiation image recorded thereon, a means for moving said recording medium, and a light detection means for photoelectrically detecting the amount of light emission by said recording medium upon exposure to said light and obtaining image signals for use in reproduction of a visible image, and a system for adjusting read-out conditions for the final read-out and/or image processing conditions for an image processing of final read-out image signals, which are detected by the final read-out, based on image signals for condition adjustment detected by reading out the image information recorded on the recording medium, wherein the improvement comprises constituting said system for adjusting said read-out conditions for the final read-out and/or said image processing conditions by:

(i) a means for discriminating, based on said image signals for condition adjustment, whether the image which said image signals represent has line symmetry or not, and (ii) a means for adjusting said read-out conditions for the final read-out and/or said image processing conditions in accordance with the results of said discrimination.

With the method of and apparatus for reading out a radiation image wherein the image signals for condition adjustment are utilized for discriminating whether the image which the image signals represent has line symmetry or not, and the read-out conditions for the final read-out and/or the image processing conditions are adjusted in accordance with the results of the discrimination, it is possible to make constant the density of the image region concerned in the reproduced visible image regardless of the image recording direction of the object.

The present invention also provides a method of discriminating whether an image has line symmetry or not comprising solely said step of discriminating symmetry.

By the term "recording medium" as used herein is meant a medium capable of recording a radiation image thereon, such as a stimulable phosphor sheet. However, the recording medium is not limited to the stimulable phosphor sheet.

By the term "final read-out" as used herein is meant the operation of detecting (reading out) the image signals for use in reproduction of a visible image from the recording medium, and this term is used in this sense also for the recording medium other than the stimulable phosphor sheet.

By the term "read-out conditions" as used herein are meant various conditions affecting the relationship between the input and output of a read-out means, for example, the relationship between the input to a photoelectric read-out means (i.e. the amount of light emitted by the stimulable phosphor sheet in the read-out step) and the output of the photoelectric read-out means (i.e. the levels of the image signals) in the case where the recording medium is the stimulable phosphor sheet. For example, the read-out conditions mean the read-out gain (sensitivity), the scale factor (latitude) or the like.

By the term "image processing conditions" as used herein are meant various conditions affecting the relationship between the input and output of an image processing means, for example, gradation processing conditions, frequency response processing conditions, or the like.

The term "image signals for condition adjustment" as used herein means the image signals which are utilized for adjusting the read-out conditions for the final read-out and/or the image processing conditions and which are obtained by reading out the image information recorded on the recording medium. For example, the aforesaid preliminary read-out image signals or the final read-out image signals may be utilized as the image signals for condition adjustment. However, the image signals for condition adjustment are not limited to the preliminary read-out image signals or the final read-out image signals. In the case where the preliminary read-out image signals are utilized as the image signals for condition adjustment, the read-out conditions for the final read-out and/or the image processing conditions can be adjusted based thereon. However, in the case where the final read-out image signals are used as the image signals for condition adjustment, only the image processing conditions can be adjusted based thereon.

The term "adjusting in accordance with results of discrimination" as used herein embraces the case where the read-out conditions for the final read-out and/or the image processing conditions are adjusted in accordance with only the results of the discrimination and the case where the conditions are adjusted in accordance with the results of the discrimination and other factors such as the image recording portion of the object, the image recording method, or an appropriate characteristic value of the recorded image information.

Adjustment of the read-out conditions for the final read-out and/or the image processing conditions may be carried out in any manner insofar as the conditions are adjusted in accordance with the results of the discrimination, i.e. by the utilization of the results of the discrimination. Thus the method of adjusting the conditions is not limited to a specific one.

Normally, images including a specific region concerned and recorded in different image recording directions have patterns different from each other. Specifically, in the case of the image recorded by front image recording as shown in FIG. 2A for example, the thoracic vertebrae K extend vertically at the center of the image in the horizontal direction, and the image is approximately symmetric with respect to the center line of the thoracic vertebrae K. On the other hand, in the case of the image recorded by side image recording as shown in FIG. 2B, the image does not have the line symmetry. Therefore, in the cases of such images, front image recording and side image recording can be indirectly discriminated from each other by discriminating whether the images have line symmetry or not. Accordingly, the read-out conditions for the final read-out and/or the image processing conditions are adjusted to increase the density of the reproduced visible image when line symmetry is found, and to decrease the density of the visible image when no line symmetry is found. Thus the density of the thoracic vertebra image portion as the region concerned can be maintained identical between the case of front image recording and the case of the side image recording.

BRIEF DESCRIPTION OF THE DRAWINGS

FIG. 6 is a block diagram showing anther example of the density correction control circuit for carrying out the method of reading out a radiation image in accordance with the present invention.

DESCRIPTION OF THE PREFERRED EMBODIMENTS

The present invention will hereinbelow be described in further detail with reference to the accompanying drawings.

Figure 1:
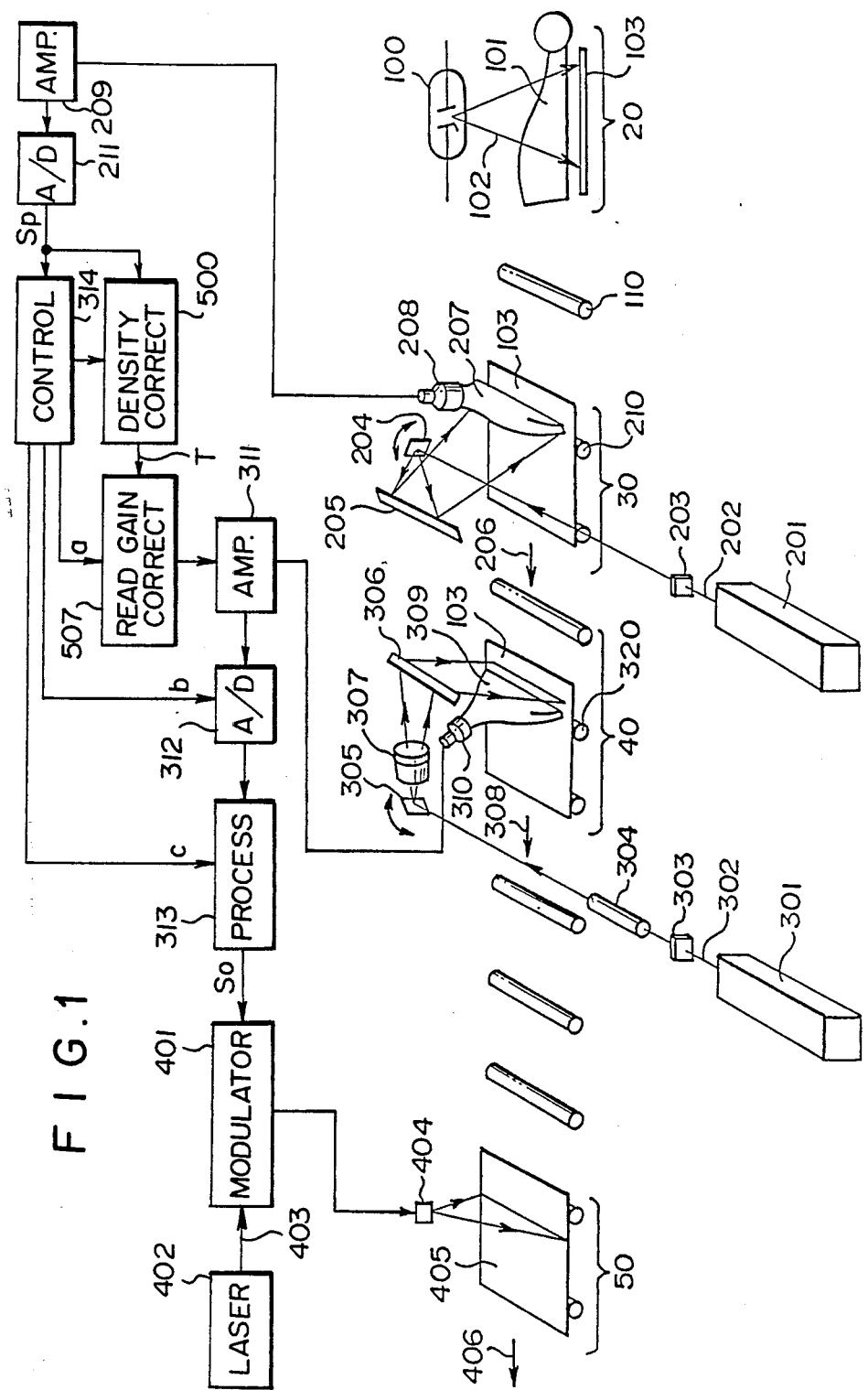
FIG. 1 is a schematic view showing an example of the radiation image recording and reproducing system wherein an embodiment of the method of reading out a radiation image in accordance with the present invention is employed.

Referring to FIG. 1, a radiation image recording and reproducing system basically comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the range of the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emanated thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction as indicated by the arrow 206 (i.e. in the sub-scanning direction) by a sheet conveyance means 210 constituted by conveyor rollers or the like, and thus the overall surface of the stimulable phosphor sheet 103 is exposed to and scanned by the laser beam 202. The power of the laser beam source 201, the beam diameter of the laser beam 202, the scanning speed of the laser beam 202, and the moving speed of the stimulable phosphor sheet 103 are selected so that the level of the stimulation energy of the laser beam 202 for preliminary read-out is lower than the level of the stimulation energy of the laser beam for the final read-out carried out at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving faceof the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into electric signals carrying the image information stored on the stimulable phosphor sheet 103, and amplified by an amplifier 209. The signals generated by the amplifier 209 are digitized by an A/D converter 211, and sent as preliminary read-out image signals Sp to a final read-out control circuit 314 at the final read-out section 40. On the basis of the preliminary read-out image signals Sp, the final read-out control circuit 314 calculates a read-out gain setting value (a), a scale factor setting value (b), and a gradation processing condition setting 10. value (c) as one of image processing condition setting values by means of histogram analysis or the like.

After the preliminary read-out is finished, the stimulable phosphor sheet 103 is sent to the final read-out section 40. At this section, a laser beam 302 emanated by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is disposed an f8 lens 307 for maintaining the beam diameter of the laser beam 302 uniform in the course of the scanning of the laser beam 302 on the stimulable phosphor sheet 103. While the laser beam 302 impinges upon the stimulable phosphor sheet 103, the stimulable phosphor sheet 103 is moved in the direction as indicated by the arrow 308 (i.e. in the sub-scanning direction) by a sheet conveyance means 320 constituted by conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanated from the light output face of the light guide member 309 and received by a photodetector 310 constituted by a photomultiplier or the like. The light receiving face of the photodetector 310 is closely contacted with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 the read-out gain of which has been adjusted by the read-out gain setting value (a) calculated by the control circuit 314. The amplified electric signals are fed to an A/D converter 312 which converts the electric signals into digital signals by use of a scale factor which has been adjusted by the scale factor setting value (b) to suit the width of signal fluctuation. The digital signals, i.e.

the final read-out image signals thus obtained are fed to a signal processing circuit 313, in which they are subjected to a gradation processing (signal processing) based on the gradation processing condition setting value (c) so as to obtain a visible radiation image suitable for viewing, particularly for diagnostic purposes, and are output as read-out image signals (final read-out image signals) So.

The final read-out image signals So generated by the signal processing circuit 313 are fed to a light modulator 401 at the image reproducing section 50. At the image reproducing section 50, a laser beam 403 emanated by a reproducing laser beam source 402 is modulated by the light modulator 401 on the basis of the final read-out image signals So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction as indicated by the arrow 406. Accordingly, the radiation image represented by the final read-out image signals So is recorded on the photosensitive material 405. For reproducing the radiation image, it is possible to use any other appropriate method such as the aforesaid displaying on a CRT.

Figure 2A:
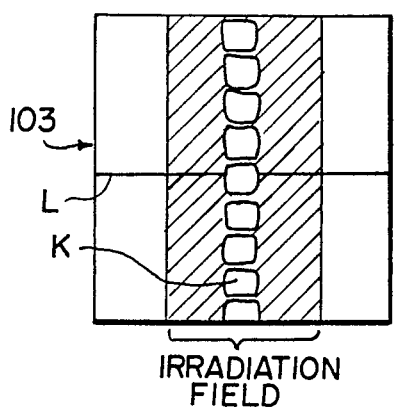
FIGS. 2A and 2B are schematic views showing examples of radiation images recorded in different image recording directions of an object.
Figure 2B:
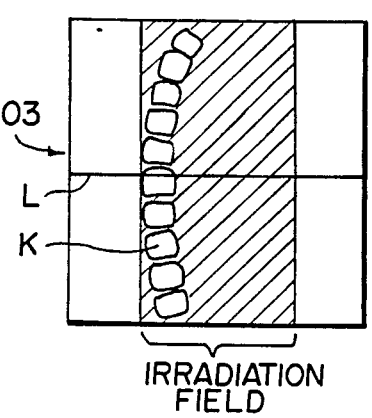
Figure 3A:
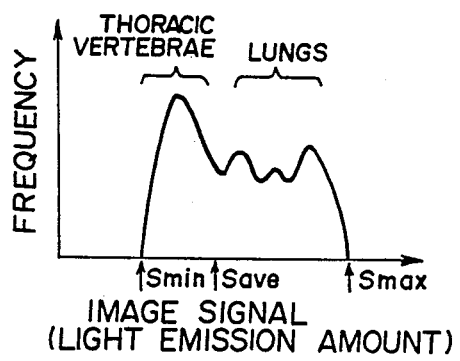
FIGS. 3A and 3B are examples of histograms of the read-out image signals detected from stimulable phosphor sheets on which image recording has been carried out in different image recording directions of the object.
Figure 3B:
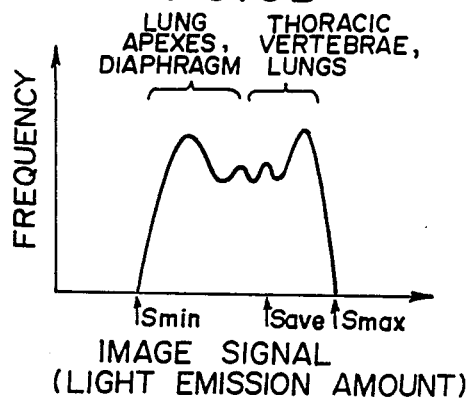
Figure 4:
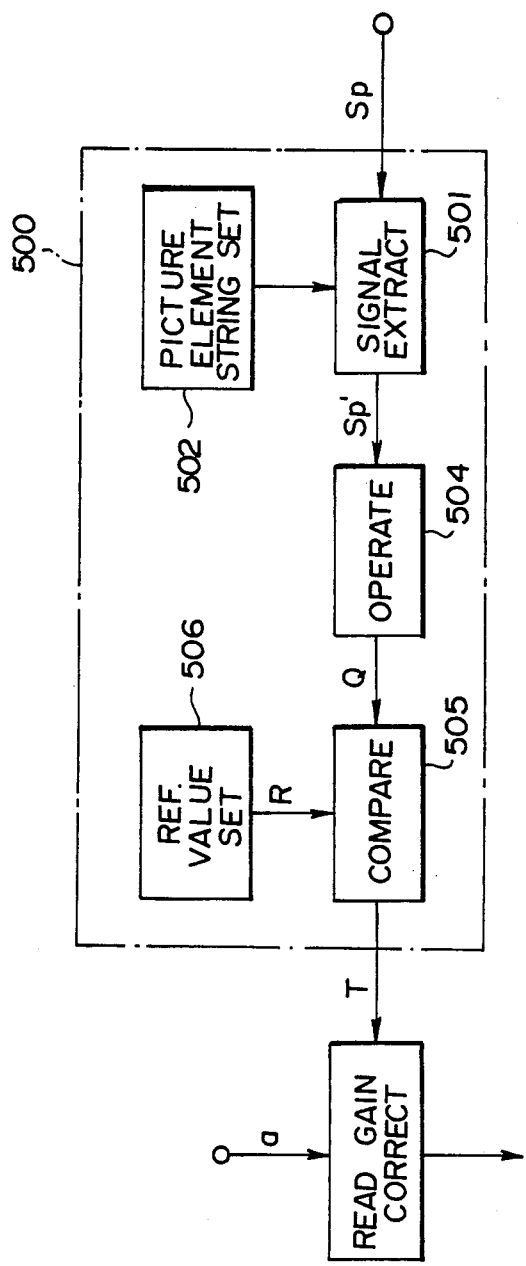
FIG. 4 is a block diagram showing in detail a part of the radiation image recording and reproducing system shown in FIG. 1, FIGS. 5A and 5B are graphs showing examples of distributions of image signals extracted in accordance with the present invention.
Figure 5A:
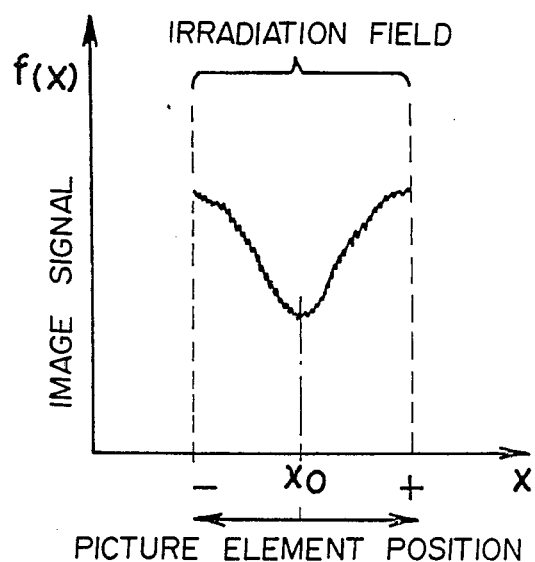
Figure 5B:
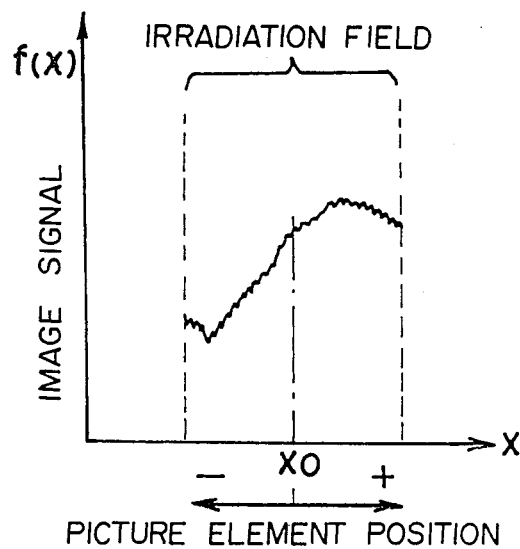

The technique of making constant the density of the image region concerned in the reproduced visible image in accordance with the present invention even though the image recording direction of the object 101 is changed will be described hereinbelow. The preliminary read-out image signals Sp generated by the A/D converter 211 are sent to the final read-out control circuit 314 as mentioned above and to a density correction control circuit 500. FIG. 4 shows in detail the configuration of the density correction control circuit 500. As shown in FIG. 4, a signal extracting section 501 of the density correction control circuit 500 extracts only the image signals at a picture element string L in a predetermined direction on the stimulable phosphor sheet 103 from the fed preliminary readout image signals Sp. The picture element string L is as shown in FIGS. 2A and 2B. For example, for the radiation image of the thoracic vertebrae K as mentioned above, the picture element string L extending horizontally on the stimulable phosphor sheet 103 is selected by a picture element setting section 502. The case of reading out the radiation image of the thoracic vertebrae K will hereinbelow be described by way of example. Preliminary read-out image signals Sp' extracted as mentioned above only at the picture element string L are sent to an operating section 504. The operating section 504 calculates differences between the preliminary read-out image signals Sp' at picture elements present at equal distances in directions opposite to each other from the center position xo of the picture element string L, and calculates a cumulated value Q of the absolute values of the calculated differences. Specifically, the operating section 504 calculates the cumulated value Q expressed as $$Q = \sum_{i=1}^{N/2} |f(xi) - f(-xi)|$$

where x denotes the positions of the respective picture elements expressed with reference to the center position xo of the picture element string L as shown in FIG. 5A or FIG. 5B (one direction is expressed with a "+" sign, and the other direction is expressed with a "−" sign),
f(x) denotes the image signals at the picture elements present at the respective positions x, and N denotes the number of the picture elements of the picture element string L. Also, in the aforesaid formula, xi denotes the position of the i'th picture element in the plus direction from the reference point xo, and −xi denotes the position of the i'th picture element in the minus direction from the reference point xo. The cumulated value Q is fed to a comparing section 505, which compares the cumulated value Q with a reference value R received from a reference value setting section 506, and sends a correction signal T to a read-out gain correcting circuit 507 in the case where the cumulated value Q is larger than the reference value R. Upon receiving the correction signal T, the read-out gain correcting circuit 507 corrects the read-out gain setting value (a), which has been calculated as mentioned above by the final read-out control circuit 314, so as to decrease the read-out gain. The preliminary read-out image signals Sp', i.e. f(x), extracted in the case of the image of the thoracic vertebrae K recorded by front image recording and the image thereof recorded by side image recording are distributed respectively as shown in FIG. 5A and FIG. 5B. Specifically, since the image recorded by front image recording has line symmetry as mentioned above, the distribution of the image signals f(x) in the image recorded by front image recording naturally has line symmetry. On the other hand, in the case of the image recorded by side image recording, no line symmetry is found. Therefore, the cumulated value Q attains a very small value in the case of the image recorded by front image recording, and attains a very large value in the case of the image recorded by side image recording. Also, as mentioned above, when the read-out conditions for the final read-out and/or the image processing conditions are constant, the density at the image portion of the thoracic vertebrae K in the reproduced visible image becomes higher in the case of side image recording than in the case of front image recording. To eliminate this problem, the readout gain is decreased by correcting as mentioned above in the case where the cumulated value Q is comparatively large, i.e. in the case of reading out the image recorded by side image recording. As a result, the levels of the final read-out image signals So become generally low, and the density of the visible radiation image reproduced on the photosensitive material 405 becomes low as a whole. Accordingly, the density of the image portion of the thoracic vertebrae K in the visible image reproduced in the case of side image recording is adjusted to be equal to the density of the image portion of the thoracic vertebrae K in the visible image reproduced in the case of front image recording. The appropriate correction amount of the readout gain can be determined experimentally.

In the aforesaid embodiment, the final read-out for the radiation image recorded by front image recording is carried out without changing the read-out gain as adjusted by the final read-out control circuit 314, and the read-out gain is corrected to a smaller value when reading out the radiation image recorded by side image recording. Conversely, the final read-out for the radiation image recorded by side image recording may be carried out without changing the read-out gain as adjusted by the final read-out control circuit 314, and the read-out gain may be corrected to a larger value when reading out the radiation image recorded by front image recording. Also, instead of correcting the read-out gain as adjusted by the final read-out control circuit 314 as in the aforesaid embodiment, the read-out gain setting value (a) calculated by the final read-out control circuit 314 may be increased or decreased in accordance with the aforesaid cumulated value Q. In order to adjust the density of the reproduced visible image, instead of changing the read-out gain as mentioned above, the conditions of the scale factor in the A/D converter 312 may be changed, or the gradation processing conditions in the signal processing circuit 313 may be changed. Or, these methods of adjusting the density may be employed in combination with each other.

The gradation processing conditions are usually expressed by a non-linear gradation curve. For example, in the case where the gradation processing conditions determined by the final read-out control circuit 314 are corrected by the correction signal T, the gradation curve may be shifted vertically or horizontally in accordance with the correction signal T, or may be rotated around a predetermined position on the gradation curve, so that the density of the region concerned in the reproduced visible image is made constant.

In the signal extracting section 501, the preliminary read-out image signals Sp' need not necessarily be extracted at all of the picture elements along the predetermined line on the stimulable phosphor sheet 103, and the preliminary read-out image signals Sp' may be extracted only at an appropriate number of the picture elements present at intervals.

Though in the aforesaid embodiment the cumulated value Q is utilized to discriminate whether the image subjected to image read-out has line symmetry or not, any other method may be used for this purpose. Another embodiment of the method of reading out a radiation image in accordance with the present invention, wherein discrimination of line symmetry is carried out without using the cumulated value Q, will hereinbelow be described with reference to FIG. 6. FIG. 6 shows a density correction control circuit 500' employed in place of the density correction control circuit 500 as shown in FIG. 4. In FIG. 6, similar elements are numbered with the same reference numerals with respect to FIG. 4. In the density correction control circuit 500', the preliminary read-out image signals Sp' extracted by the signal extracting section 501 are sent to an analysis section 503. The analysis section 503 expresses the extracted preliminary read-out image signals Sp' as the function f(x) of the positions x of the respective picture elements of the picture element string L, and calculates a quadratic equation approximately representing the relationship between the function f(x) and the positions x of the respective picture elements and expressed as $$f(x) = px^2 + qx + r.$$

After calculating the approximate equation, the analysis section 503 sends the value of $-q/2p$ to an operating section 504'. The operating section 504' calculates a difference Q' between the center position xo of the picture element string L and the value of $-q/2p$, and sends the difference Q' to the comparing section 505. The comparing section 505 compares the difference Q' with a reference value R' received from the reference value setting section 506, and sends the correction signal T to the read-out gain correction circuit 507 in the case where the difference Q' is larger than the reference value R'. Upon receiving the correction signal T, the read-out gain correcting circuit 507 corrects the read-out gain setting value (a), which has been calculated by the final read-out control circuit 314, so as to decrease the read-out gain.

Figure 7A:
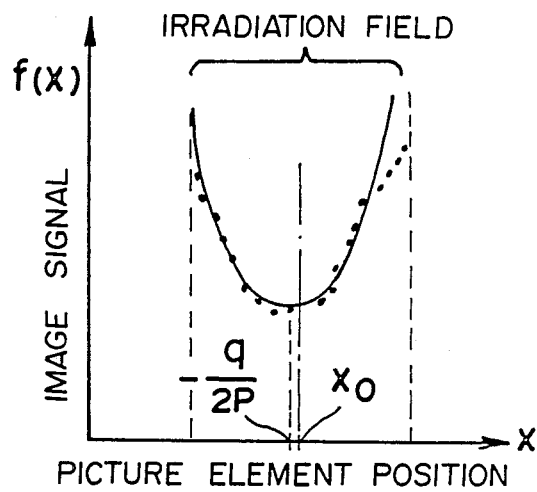
FIGS. 7A and 7B are graphs showing the relationships between the distribution of image signals and an approximate equation utilized in accordance with the present invention.
Figure 7B:
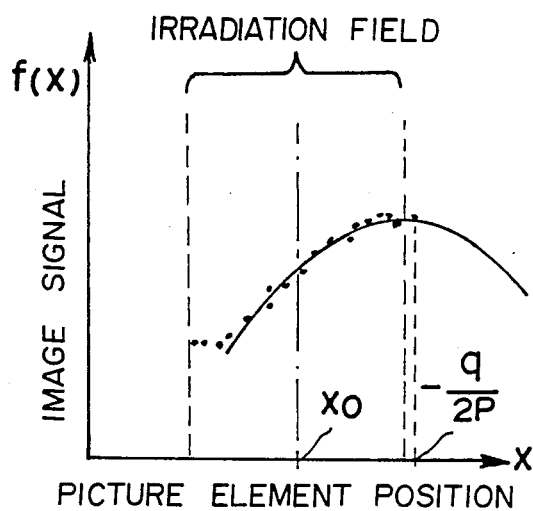

The aforesaid value of $-q/2p$ represents the position of the picture element at which the aforesaid quadratic equation attains the maximum value or the minimum value. The curve of second degree which the quadratic equation expresses becomes as shown in FIG. 7A in the case of the thoracic vertebra image recorded by front image recording, and becomes as shown in FIG. 7B in the case of the thoracic vertebra image recorded by side image recording. Specifically, in the case of the image recorded by front image recording, since it has line symmetry, the picture element position $-q/2p$ at which the aforesaid quadratic equation attains the minimum value is very close to the center position xo of the picture element string L as shown in FIG. 7A. On the other hand, in the case of the image recorded by side image recording, the picture element position $-q/2p$ at which the aforesaid quadratic equation attains the maximum value is distant from the center position xo of the picture element string L as shown in FIG. 7B. Therefore, it is only in the case of reading out the image recorded by side image recording that the aforesaid difference Q' exceeds the reference value R'. In this case, the read-out gain is decreased as mentioned above, so that the density of the reproduced visible image becomes low as a whole. As a result, the density of the thoracic vertebra image portion becomes low and equal to the density of the thoracic vertebra image portion in the visible image reproduced in the case of front image recording.

The density of the thoracic vertebra image portion as the region concerned is made constant in the manner as mentioned above between the cases of front image recording and side image recording of the thoracic vertebra image. However, the method of reading out a radiation image in accordance with the present invention is applicable in the same manner also to the case where a radiation image is read out from the stimulable phosphor sheet carrying a radiation image of the other object portions such as the lumbar vertebrae recorded thereon, or the stimulable phosphor sheets on which image recording has been carried out in various different image recording directions of the object, for example, by front image recording and oblique image recording. Specifically, in the case where one of the images recorded in different image recording directions of the object has line symmetry and the other thereof does not have line symmetry, it is possible to discriminate whether the image has line symmetry or not by the method as mentioned above, and the density of the reproduced visible image may be increased or decreased in accordance with the results of the discrimination.

The position of the picture element string L and the reference values R and R' may be specified manually in accordance with the image recording portion of the object and the image recording direction of the image subjected to image read-out. Or, in the case where the information on the image recording portion of the object and the image recording direction is entered as an image recording menu to the read-out apparatus, the position of the picture element string L and the reference values R and R' may be set automatically based on the entered information at the picture element setting section 502 and the reference value setting section 506.

In the radiation image recording and reproducing system shown in FIG. 1, the preliminary read-out section and the final read-out section are disposed independently. However, as disclosed in, for example, Japanese Unexamined Patent Publication No. 58(1983)-67242, a single read-out system may be used for the preliminary read-out and the final read-out. In this case, after the preliminary readout is finished, the stimulable phosphor sheet is returned to the read-out system by a sheet conveyance means and then the final read-out is carried out. In the preliminary readout step, the stimulation energy of the stimulating rays is adjusted by a stimulating ray energy adjusting means to be lower than the stimulation energy of the stimulating rays used in the final read-out. The present invention is also applicable to such a case.

The present invention is applicable also to the case of subdivision image recording wherein a single stimulable phosphor sheet is divided into, for example, two subdivisions and image recording is carried out at each subdivision. In the case of the subdivision image recording, the present invention may be applied to each of the subdivisions.

In the aforesaid radiation image recording and reproducing system, the image signals for condition adjustment are obtained by the preliminary read-out, and the read-out conditions for the final read-out and/or the image processing conditions are adjusted based on the results of the discrimination of line symmetry obtained from the image signals for condition adjustment. However, in a radiation image recording and reproducing system wherein the preliminary read-out is not carried out, the final read-out image signals may be utilized as the image signals for condition adjustment. In this case, the final read-out image signals may be stored in a storage means, and the image processing conditions may be adjusted in accordance with the results of the discrimination of line symmetry carried out in the same manner as mentioned above based on the final read-out image signals. Then, the final read-out image signals may be read from the storage means, and the image processing of the final read-out image signals may be carried out by use of the thus adjusted image processing conditions.

As mentioned above, with the method of reading out a radiation image in accordance with the present invention, even though the image recording direction of the object is different, it is possible to make constant the density of the image region concerned in the reproduced visible image, and to markedly improve the image quality of the visible radiation image, particularly the diagnostic efficiency and accuracy.

It should be understood that the present invention can be modified in various manners within the scope thereof, and is not limited to the aforesaid embodiments.

For example, it would be understood that the method of discriminating whether an image has line symmetry or not can be used by itself separately from said method of reading out a radiation image as mentioned hereinbefore.

I claim:

1. A method of reading out a radiation image in which final read-out is carried out for detecting image signals for use in reproduction of a visible image from a recording medium carrying a radiation image recorded thereon, and read-out conditions for the final read-out and/or image processing conditions for an image processing of final read-out image signals detected by the final readout are adjusted based on image signals for condition adjustment detected by reading out the image information recorded on the recording medium,
   wherein the improvement comprises the steps of:
   (i) discriminating, based on said image signals for condition adjustment, whether the image which said image signals represent has line symmetry or not, and
   (ii) adjusting said read-out conditions for the final read-out and/or said image processing conditions in accordance with the results of said discrimination.

2. A method as defined in claim 1 wherein said discrimination is carried out by:
   (a) extracting image signals at a picture element string in a predetermined direction on said recording medium from said image signals for condition adjustment,
   (b) calculating differences between said extracted image signals at picture elements present at equal distances in directions opposite to each other from the center position of said picture element string, and
   (c) judging that the image which said image signals represent has line symmetry in the case where a cumulated value of absolute values of said differences is not larger than a predetermined value, and judging that the image which said image signals represent does not have line symmetry in the case where said cumulated value is larger than said predetermined value.

3. A method as defined in claim 1 wherein said discrimination is carried out by:
   (a) extracting image signals at a picture element string in a predetermined direction on said recording medium from said image signals for condition adjustment,
   (b) approximately expressing relationships between positions x of the respective picture elements of said picture element string and values f(x) of said extracted image signals at the picture elements in said positions x by a quadratic equation $$f(x) = px2 + qx + r,$$

and
   (c) judging that the image which said image signals represent has line symmetry in the case where a difference between the value of $-q/2p$ and a center position xo of said picture element string is not larger than a predetermined value, and judging that the image which said image signals represent does not have line symmetry in the case where said difference is larger than said predetermined value.

4. A method as defined in claim 1 wherein preliminary read-out is carried out for ascertaining the image information recorded on said recording medium prior to said final read-out, and image signals obtained by said preliminary read-out are utilized as said image signals for condition adjustment.

5. A method as defined in claim 1 wherein said recording medium is composed of a stimulable phosphor.

6. A radiation image read-out apparatus comprising a final read-out system provided with a means for emitting light to a recording medium carrying a radiation image recorded thereon, a means for moving said recording medium, and a light detection means for photoelectrically detecting the amount of light emission by said recording medium upon exposure to said light and obtaining image signals for use in reproduction of a visible image, and a system for adjusting read-out conditions for the final read-out and/or image processing conditions for an image processing of final read-out image signals, which are detected by the final read-out, based on image signals for condition adjustment detected by reading out the image information recorded on the recording medium, wherein the improvement comprises constituting said system for adjusting said read-out conditions for the final read-out and/or said image processing conditions by:

(i) a means for discriminating, based on said image signals for condition adjustment, whether the image which said image signals represent has line symmetry or not, and (ii) a means for adjusting said read-out conditions for the final read-out and/or said image processing conditions in accordance with the results of said discrimination.

7. An apparatus as defined in claim 6 wherein said discrimination means comprises:

(a) a means for extracting image signals at a picture element string in a predetermined direction on said recording medium from said image signals for condition adjustment, (b) a means for calculating differences between said extracted image signals at picture elements present at equal distances in directions opposite to each other from the center position of said picture element string, and (c) a means for judging that the image which said image signals represent has line symmetry in the case where a cumulated value of absolute values of said differences is not larger than a predetermined value, and judging that the image which said image signals represent does not have line symmetry in the case where said cumulated value is larger than said predetermined value.

8. An apparatus as defined in claim 6 wherein said discrimination means comprises:

(a) a means for extracting image signals at a picture element string in a predetermined direction on said recording medium from said image signals for condition adjustment, (b) a means for approximately expressing relationships between positions x of the respective picture elements of said picture element string and values f(x) of said extracted image signals at the picture elements in said positions x by a quadratic equation $$f(x) = px2 + qx + r,$$

and (c) a means for judging that the image which said image signals represent has line symmetry in the case where a difference between the value of $-q/2p$ and a center position xo of said picture element string is not larger than a predetermined value, and judging that the image which said image signals represent does not have line symmetry in the case where said difference is larger than said predetermined value.

9. An apparatus as defined in claim 6 wherein the apparatus further comprises a preliminary read-out system provided with a means for emitting light to said recording medium, a means for moving said recording medium, and a light detection means for photoelectrically detecting the amount of light emission by said recording medium upon exposure to said light and obtaining image signals, and said system for adjusting read-out conditions for the final read-out and/or said image processing conditions utilizes said image signals obtained by said preliminary read-out as said image signals for condition adjustment.

10. An apparatus as defined in claim 6 wherein said recording medium is composed of a stimulable phosphor, and said means for emitting light to said recording medium carrying a radiation image recorded thereon is a means for emitting stimulating rays which cause said stimulable phosphor to emit light in proportion to radiation energy stored on said stimulable phosphor.

11. A method of discriminating whether an image has line symmetry or not comprising the steps of:

(a) extracting image signals at a picture element string in a predetermined direction on a recording medium from image signals for use in reproduction of a visible image, (b) calculating differences between said extracted image signals at picture elements present at equal distances in directions opposite to each other from the center position of said picture element string, and (c) judging that the image which said image signals represent has line symmetry in the case where a cumulated value of absolute values of said differences is not larger than a predetermined value, and judging that the image which said image signals represent does not have line symmetry in the case where said cumulated value is larger than said predetermined value.

12. A method of discriminating whether an image has line symmetry or not comprising the steps of:

(a) extracting image signals at a picture element string in a predetermined direction on a recording medium from image signals for use in reproduction of a visible image, (b) approximately expressing relationships between positions x of the respective picture elements of said picture element string and values f(x) of said extracted image signals at the picture elements in said positions x by a quadratic equation $$f(x) = px2 + qx + r,$$

and (c) judging that the image which said image signals represent has line symmetry in the case where a difference between the value of $-q/2p$ and a center position xo of said picture element string is not larger than a predetermined value, and judging that the image which said image signals represent does not have line symmetry in the case where said difference is larger than said predetermined value.

* * * * *